United States Patent
Kalhan et al.

(10) Patent No.: US 10,172,174 B2
(45) Date of Patent: Jan. 1, 2019

(54) SELECTION BETWEEN CELLULAR COMMUNICATION LINK AND DEVICE-TO-DEVICE (D2D) COMMUNICATION LINK USING REFERENCE SIGNALS

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/329,944

(22) PCT Filed: Aug. 6, 2015

(86) PCT No.: PCT/US2015/044079
§ 371 (c)(1),
(2) Date: Jan. 27, 2017

(87) PCT Pub. No.: WO2016/022844
PCT Pub. Date: Feb. 11, 2016

(65) Prior Publication Data
US 2017/0245312 A1    Aug. 24, 2017

Related U.S. Application Data

(60) Provisional application No. 62/034,964, filed on Aug. 8, 2014.

(51) Int. Cl.
*H04W 76/14* (2018.01)
*H04W 76/10* (2018.01)
(Continued)

(52) U.S. Cl.
CPC .......... *H04W 76/14* (2018.02); *H04L 5/0048* (2013.01); *H04W 40/12* (2013.01); *H04W 76/10* (2018.02);
(Continued)

(58) Field of Classification Search
None
See application file for complete search history.

(56) References Cited

U.S. PATENT DOCUMENTS 9,402,262 B2 *  7/2016  Zhu ..................... H04W 72/082
2009/0011778 A1  1/2009  Jung et al.
(Continued)

FOREIGN PATENT DOCUMENTS

JP    2009-017559 A    1/2009
JP    2012-227884 A    11/2012
(Continued)

OTHER PUBLICATIONS

Qualcomm Incorporated; "Reference Signal Design for D2D," R1-141963, 3GPP TSG-RAN WG1 #77; May 10, 2014; Seoul, South Korea.
(Continued)

*Primary Examiner* — Anh Ngoc M Nguyen

(57) ABSTRACT

A base station (eNB) selects between a cellular communication link and a device-to-device (D2D) communication link for communication between a first user equipment (UE) device and a second UE device. The eNB instructs each UE device to transmit a reference signal that is received by the other UE device and the eNB. Each UE device reports D2D channel characteristic information indicative of the received reference signal. The eNB determines first cellular channel characteristic information of a first portion of a cellular communication link between the first UE device and the eNB and determines second cellular channel characteristic information of a second portion of the cellular communication link between the second UE device and the eNB. Based on at least one of the first cellular channel characteristic information, the second cellular channel characteristic information, and the D2D channel characteristic information, the (Continued)

eNB selects cellular communication or D2D communication for communication between the UE devices.

19 Claims, 5 Drawing Sheets

(51) Int. Cl.
    *H04W 40/12*     (2009.01)
    *H04L 5/00*     (2006.01)
    *H04W 40/02*     (2009.01)

(52) U.S. Cl.
    CPC ........... *H04L 5/0057* (2013.01); *H04W 40/02* (2013.01); *Y02D 70/00* (2018.01); *Y02D 70/1262* (2018.01); *Y02D 70/21* (2018.01); *Y02D 70/30* (2018.01); *Y02D 70/34* (2018.01)

(56) References Cited

U.S. PATENT DOCUMENTS

| | | |
|---|---|---|
| 2014/0010172 A1 | 1/2014 | Wei et al. |
| 2014/0038633 A1 | 2/2014 | Iwamura et al. |
| 2014/0185529 A1 | 7/2014 | Dongguk et al. |
| 2014/0185587 A1 | 7/2014 | Jang et al. |
| 2014/0213221 A1 | 7/2014 | Chai et al. |
| 2015/0208453 A1 | 7/2015 | Yamazaki et al. |
| 2016/0037322 A1* | 2/2016 | Nguyen ................ H04W 76/14 370/329 |
| 2016/0286571 A1* | 9/2016 | Gattami ................ H04W 24/10 |
| 2017/0188381 A1* | 6/2017 | Lopes Batista ... H04W 72/1231 |

FOREIGN PATENT DOCUMENTS

| | | |
|---|---|---|
| WO | WO 2013/044864 A1 | 4/2013 |
| WO | WO2013066126 A1 | 5/2013 |
| WO | WO2013074463 A1 | 5/2013 |
| WO | WO2013078946 A1 | 6/2013 |
| WO | WO 2014/017498 A1 | 1/2014 |
| WO | WO2014015101 A1 | 1/2014 |

OTHER PUBLICATIONS

Alcatel-Lucent Shanghai Bell, Alcatel-Lucent; "Consideration of Interference Mitigation for D2D Communication"; R1-132993; 3GPP TSG-RAN1 #74; Aug. 10, 2013; Barcelona, Spain.

* cited by examiner

SELECTION BETWEEN CELLULAR COMMUNICATION LINK AND DEVICE-TO-DEVICE (D2D) COMMUNICATION LINK USING REFERENCE SIGNALS

CLAIM OF PRIORITY

The present application claims priority to Provisional Application No. 62/034,964 entitled "Network-Assisted D2D Transmit UE Reference Signal Based Power Control", filed Aug. 8, 2014, assigned to the assignee hereof and hereby expressly incorporated by reference in its entirety.

FIELD

This invention generally relates to wireless communications and more particularly to selection between a cellular link and a (device-to-device) D2D link for communication between user equipment (UE) devices.

BACKGROUND

Many wireless communication systems use base stations to provide geographical service areas where wireless communication user equipment (UE) devices communicate with the base station (evolved Node B, eNB) providing the particular geographical service area in which the wireless communication UE devices are located. The base stations are connected within a network allowing communication links to be made between the wireless communication devices and other devices. In some situations, the communication links may be between UE devices within the service area of a base station. A cellular communication link between the UE devices includes communication through the base station providing the service. Where channel quality is sufficient, the UE devices can communicate directly through a device-to-device (D2D) communication link that does not include routing data through the base station. Some situations, it may be preferred to have a direct D2D communication link between the two UE devices rather than communicating through a base station.

SUMMARY

A base station (eNB) selects between a cellular communication link and a device-to-device (D2D) communication link for communication between a first user equipment (UE) device and a second UE device. The eNB instructs each UE device to transmit a reference signal that is received by the other UE device. Each UE device reports D2D channel characteristic information indicative of the received reference signal. The eNB determines cellular channel characteristic information of at least a portion of a cellular communication link between the first UE device and at the second UE device through the eNB. Based on at least one the cellular channel characteristic information and the D2D channel characteristic information, the eNB selects cellular communication or D2D communication for communication between the UE devices.

DETAILED DESCRIPTION

Figure 1A:
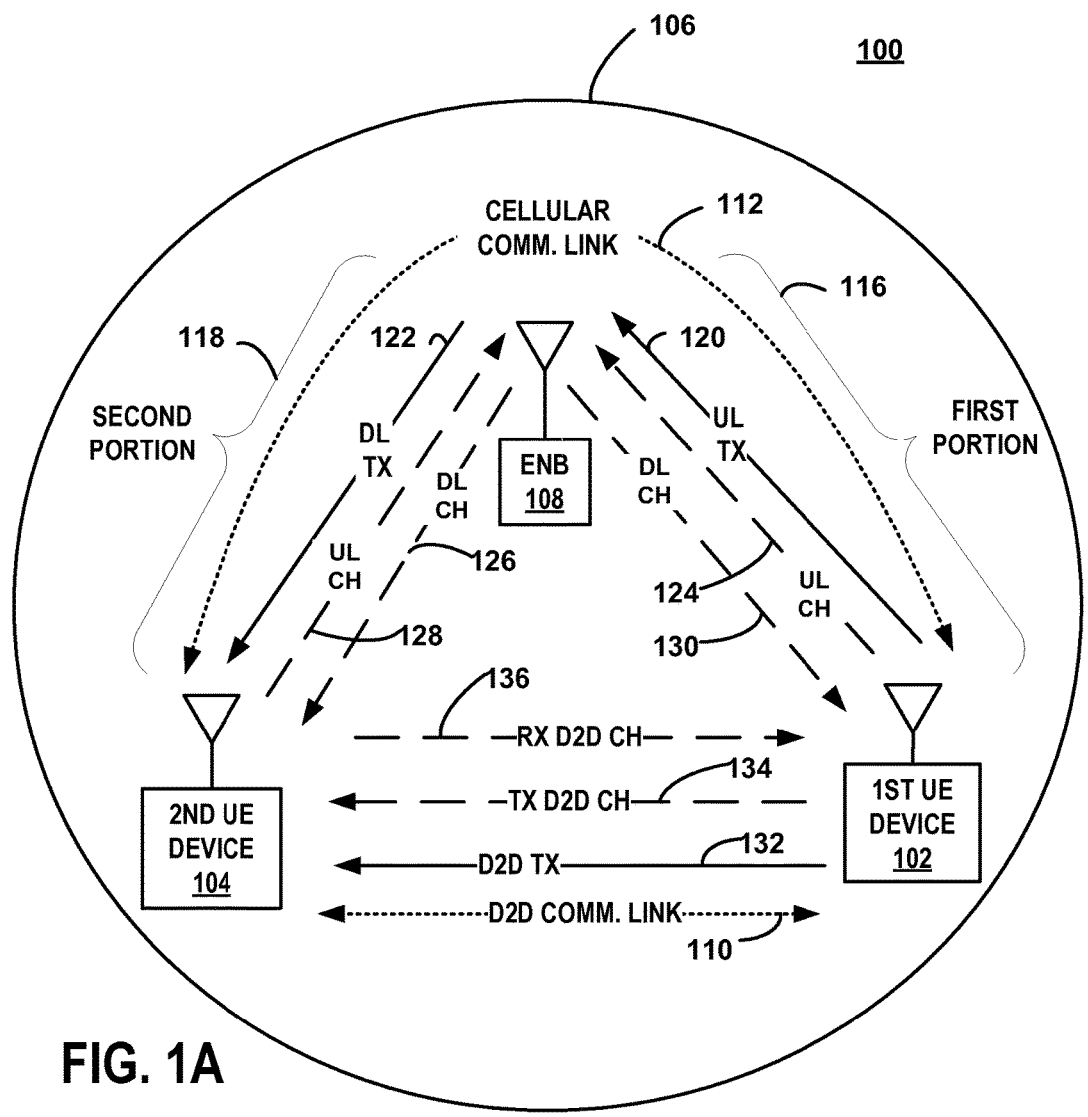
FIG. 1A is a block diagram of a cellular communication system that supports device-to-device (D2D) communication where a base station (eNB) selects a communication link for communication between a first user equipment (UE) device and a second UE device.

FIG. 1A is a block diagram of cellular communication system 100 that supports device-to-device (D2D) communication where a base station (eNB) selects a communication transmission link for transmitting data between a first user equipment (UE) device 102 and a second UE device 104. For the example, each of the two UE devices 102, 104 can be a transmitting device and a receiving device although in some situations, a device may only be a receiving or transmitting device. For the example of FIG. 1A and FIG. 1B, the first UE device 102 and the second UE device 104 are within the geographic service area 106 provided by a base station (eNB) 108 and may be capable of communicating over a D2D link. Even when the channel conditions may be adequate for supporting D2D communication, D2D may not be the preferred link. For the example, a D2D communication link 110, as well as a cellular communication link 112, can be established for transmission of data between the first UE device 102 and the second UE device 104. The D2D communication link 110 is a direct wireless communication link between the first UE device 102 and the second UE device 104 that does not route data through the base station (eNB) 108. The cellular communication link 112 includes at least a first portion 116 from the first UE device 102 to the base station (eNB) 108 and a second portion 118 from the base station (eNB) 108 to the second UE device 104. Therefore, sending data from the first UE device 102 to the second UE device 104 includes an uplink transmission 120 and a downlink transmission 122. The uplink transmission 120 is transmitted in the first portion 116 over one or more uplink channels 124. The base station 108 transmits the downlink transmission 122 to the second UE device 102 over one or more downlink channels 126. The base station 108 can also transmit downlink signals to the first UE device 102 over downlink channels 128 and receive uplink signals from the second UE device over uplink channels 130. Accordingly, for the example, the cellular communication link is bidirectional.

Sending the data from the first UE device 102 to the second UE device 104 over the D2D communication link 110 includes a D2D transmission 132 over one or more D2D transmission channels 134. The first UE device can also receive signals from the second UE device 104 over D2D reception channels 136. One or more of the D2D transmission channels 134 can be the same as the D2D reception channels 136. For the examples herein, the D2D channels 134, 136 are a subset of cellular uplink channels. In some cases, downlink channels can be used.

The base station (eNB) 108 provides wireless communication services to wireless communication user equipment (UE) devices 102, 104 within the geographical service area 106, sometimes referred to as a cell. Several base stations are typically interconnected through a backhaul (not shown) to provide several service areas to cover large areas. Other system components forming system entities and performing system functions such as Mobility Management Entity (MME), scheduling, gateway, and other functions are omitted from FIG. 1A in the interest of brevity and clarity. Any description with reference FIG. 1A of the various functions and operations of such equipment may be implemented in any number of devices, circuits, or elements. Two or more functional blocks may be integrated in a single device, and the functions described as performed in any single device may be implemented over several devices in some circumstances. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with at least one revision of the 3GPP LTE communication specification.

The base station (eNB) 108 is a fixed transceiver station, sometimes referred to as an evolved Node B, eNodeB or eNB, which may include a controller in some circumstances. The base station 108 may be connected to a controller through a backhaul which may include any combination of wired, optical, and/or wireless communication channels. The controller may include the functionality of the Mobility Management Entity (MME) and the Packet Gateway (P-GW) in a 3GPP LTE communication system.

The wireless (UE) communication devices (UE devices) 102, 104 may be referred to as mobile devices, wireless devices, wireless communication devices, mobile wireless devices, user equipment, UEs, UE devices as well as by other terms. The UE devices 102, 104 include electronics and code for communicating with base stations and with other wireless communication devices in D2D configurations. The UE devices may include devices such as cell phones, personal digital assistants (PDAs), wireless modem cards, wireless modems, televisions with wireless communication electronics, and laptop and desktop computers, as well as other devices. The combination of wireless communication electronics with an electronic device, therefore, may form a UE device 102, 104. For example, a UE device may include a wireless modem connected to an appliance, computer, or television.

The base station 108 includes a wireless transceiver that exchanges wireless signals with the UE devices 102, 104. Transmissions from the base stations and from the UE devices 102, 104 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device.

As discussed below in further detail, the eNB instructs the UE devices to transmit reference signals. The UE devices determine the D2D channel characteristics based on the received reference signals and report the D2D channel characteristics to the eNB. The eNB determines the cellular channel characteristics based on the reference signals received from the UE devices. The eNB uses the D2D channel characteristics and the cellular channel characteristics to selects either the cellular communication link 112 or the D2D communication link 110 for transmission of data between the UE devices.

Figure 1B:
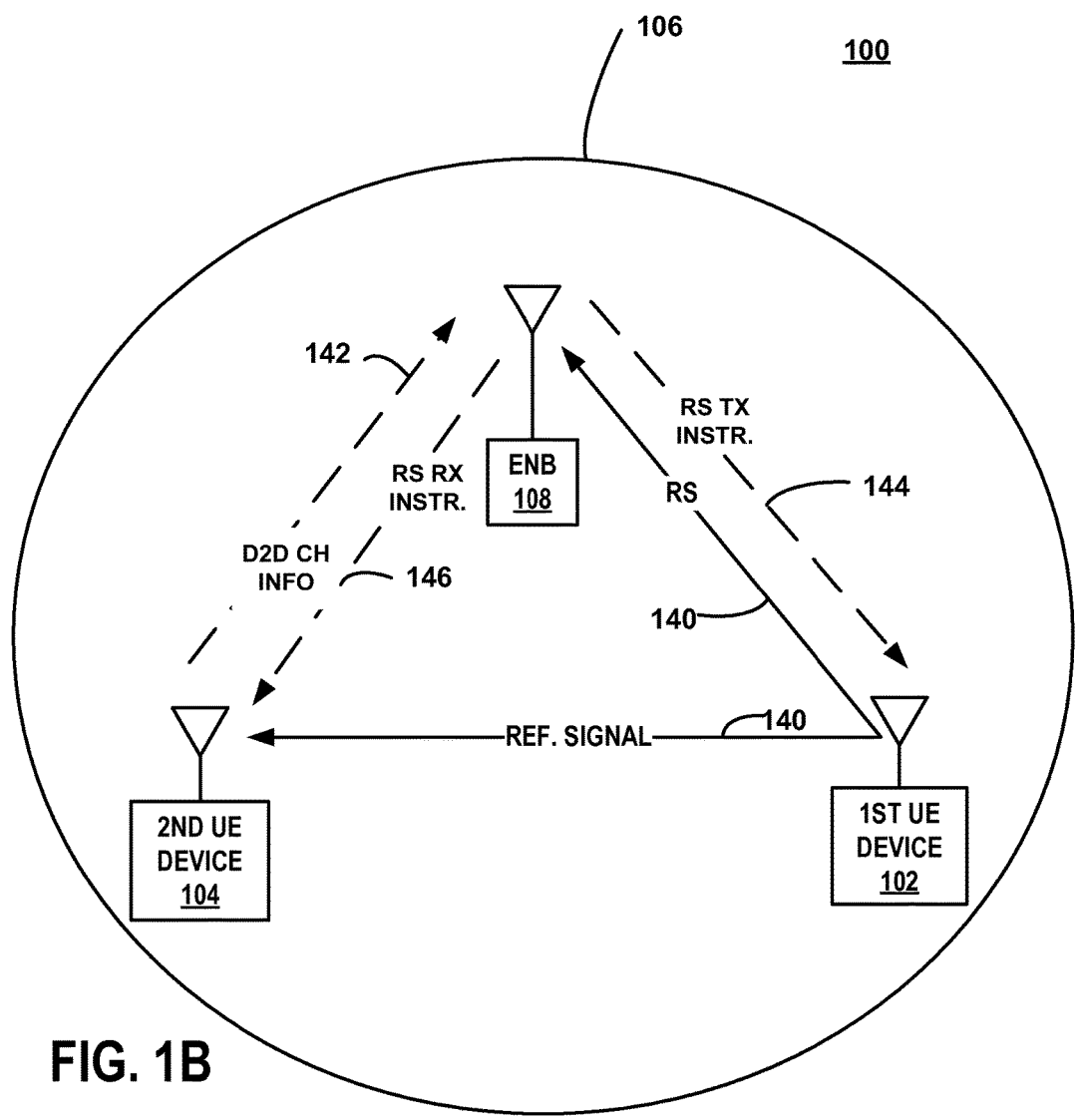
FIG. 1B is a block diagram of the cellular communication system where the eNB instructs the first UE device to transmit a reference signal and the second UE device reports D2D channel characteristic information based on the received reference signal.

FIG. 1B is a block diagram of the communication system 100 where the eNB 108 instructs the first UE device 102 to transmit a reference signal 140 and the second UE device reports D2D channel characteristic information 142 based on the received reference signal. The eNB 108 sends a reference signal transmission instruction 144 to the first UE device 102 instructing the UE device to transmit a reference signal 140. The instruction 144 identifies the communication resources that should be used by the first UE device 102 to transmit the reference signal 140. For the example, the instruction 144 is transmitted on a downlink channel such as the PDCCH/PDSCH or higher layer signaling. In some situations, the reference signal transmission instruction 144 can be broadcast over a System Information Block (SIB). Such a technique may be useful when a set of D2D UE devices are instructed at the same time. Other channels can be used to transmit the reference signal transmission instruction 144.

The reference signal transmission instruction 144 specifically identifies the resources that the UE device should use for transmitting the reference signal in some situations. In other situations, the reference signal transmission instruction 144 can identify a set of resources that the UE device may use for reference signal transmission and the UE device is instructed to autonomously select communication resources from the set to transmit a reference signal when the UE device is interested in D2D communication. For the examples, the reference signal transmission instruction 144 identifies the frequency/time communication resources for reference signal transmission and the power level for transmitting the reference signal. The power level may be based on the closed loop power control between the eNB and the first UE device. In one example, the eNB applies the same power-controlled transmit power as used for the cellular communication link 112 since the D2D communication link is the better link. In some situations greater spectral efficiency can be achieved and it may be advantageous for the eNB 108 to reuse the D2D communication resource for cellular UEs that are not in close proximity to the D2D UEs. From this perspective, even if the transmit power level for the D2D communication link is slightly higher than the cellular communication link, it might be acceptable to the eNB 108.

The reference signal is transmitted on the carrier that will be used for D2D communication. For the example, therefore, the reference signal is transmitted on the uplink carrier that is allocated for D2D communication.

The eNB 108 also transmits a reference signal reception instruction 146 to the second UE device 104 (target UE device) where the instruction 146 indicates the communication resources that will be used to transmit the reference signal 140 from the first UE device. For the example, the instruction 144 is transmitted in a downlink channel such as the PDCCH/PDSCH and/or higher layer signaling. Other channels can be used. In some situations, the reference signal reception instruction 146 identifies the set of resources that may be used for reference signal transmission. For example, the reference signal reception instruction 146 can be sent via SIB messaging. Therefore, the second UE device may report the D2D channel characteristics when the first UE device autonomously selects communication resources and transmits a reference signal that is received by the second UE device. The instruction 144 also identifies communication resources that should be used by the second UE device to transmit D2D channel characteristic information to the eNB 108. In some situations, the communication resources for reporting the channel information may be provided by the eNB in a separate message. The second UE device 104 receives the reference signal 140 and determines the D2D channel characteristic information that is then reported to the eNB 108.

The eNB 108 receives the reference signal 140 and determines the cellular channel characteristics for the first portion 116 of the cellular communication link 112. For the examples herein, the eNB 108 also instructs the second UE device 104 to transmit a reference signal (not shown in FIG. 1B). The eNB sends a reference signal transmission instruction to the second UE device and a reference signal reception instruction to the first UE device. The first UE device 102 determines the D2D channel characteristics determined from the reference signal received from the second UE device and reports the channel characteristic information to the eNB. The eNB also determines the cellular channel characteristic information of the second portion 118 of the cellular communication link based on the reference signal transmitted from the second UE device 104.

In some situations, the eNB may determine the channel characteristics of only a single portion of the cellular communication link. Therefore, the cellular channel characteristic information is indicative of at least a portion of the cellular communication link 112. For example, the cellular channel characteristic information may be related only to first portion 116, only the second portion 118, or to both the first and second portions. For the examples discussed herein, the eNB evaluates channel characteristics of the first portion and second portion of the cellular communication link as well as the D2D channel characteristic information reported by both UE devices. The channel characteristic information may be channel quality measurements in one or both directions of the link (or portion of link), may be a calculation based on such measurements, or may be combinations of measurements and calculations. For the examples herein, the channel characteristic information is indicative of the power level of the received reference signal. The channel characteristic information may be, for example, total received power, signal to-noise-ratio (SNR), signal-to-interference-plus-noise ratio (SINR) (also known as the signal-to-noise-plus-interference ratio (SNIR)) or combinations thereof. In one example, therefore, the eNB compares the total power of a first reference signal at the eNB to the total power of the first reference signal received at the second UE device and compares the total power of a second reference signal at the eNB to the total power of the second reference signal received at the first UE device. If communication link (i.e., D2D or cellular portion) having the higher total power level is determined to be the higher quality link and is selected as the preferred communication link between the UE devices. In some situations, the selection of the communication link is based on other factors in addition to the power level of the received reference signals.

In some situations, the eNB may be aware of the cellular channel characteristics between a UE device and the eNB because the eNB has been serving the UE device or has previously determined the cellular channel characteristics. For example, other reference signals different than the reference signal 140 may have been evaluated to determine the cellular channel characteristics prior to the transmission of the reference signal 140. An example of such a reference signal is a Sounding Reference Signal (SRS) that may have been received by the eNB.

Figure 2:
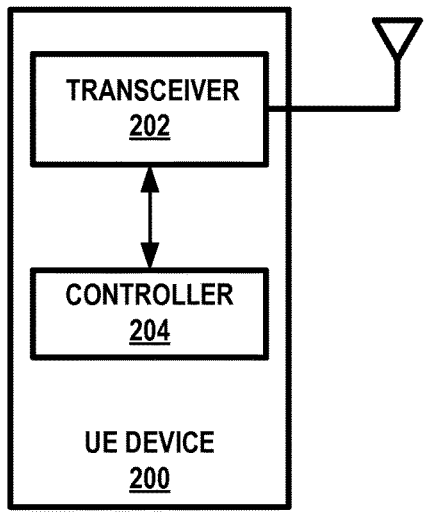
FIG. 2 is a block diagram of an example of a UE device suitable for use as both of the UE devices in FIG. 1A and FIG. 1B.

FIG. 2 is a block diagram of an example of a UE device 200 suitable for use as one of the UE devices 102, 104 in FIG. 1A and FIG. 1B. The UE device 200 includes a transceiver 202 and a controller 204, as well as other components and circuitry (not shown) such as memory and a user interface, for example.

The transceiver 202 includes a transmitter that transmits uplink wireless signals to base stations (eNBs) and a receiver that receives downlink wireless signals from base stations (eNBs) over the uplink and downlink channels, respectively. The transceiver 202 is also configured to transmit and receive D2D signals using allocated cellular resources, such as uplink communication resources, for example. The controller 204 controls components of the UE device 200 to manage the functions of the device 200 described herein as well as to facilitate the overall functionality of the device 200. The controller 204 is connected to the transceiver 202 and other components such as memory.

The receiver in the transceiver 202 may also be used to measure parameters to determine channel characteristics for the downlink channel and the D2D channels. The controller and the receiver measure one or more parameters that indicate channel characteristic information such as the quality of the channel, required transmission power for transmission through the channel, or power levels related to the received reference signal such as total received power, signal to-noise-ratio (SNR), signal-to-interference-plus-noise ratio (SINR) (also known as the signal-to-noise-plus-interference ratio (SNIR)), or combinations thereof.

Figure 3:
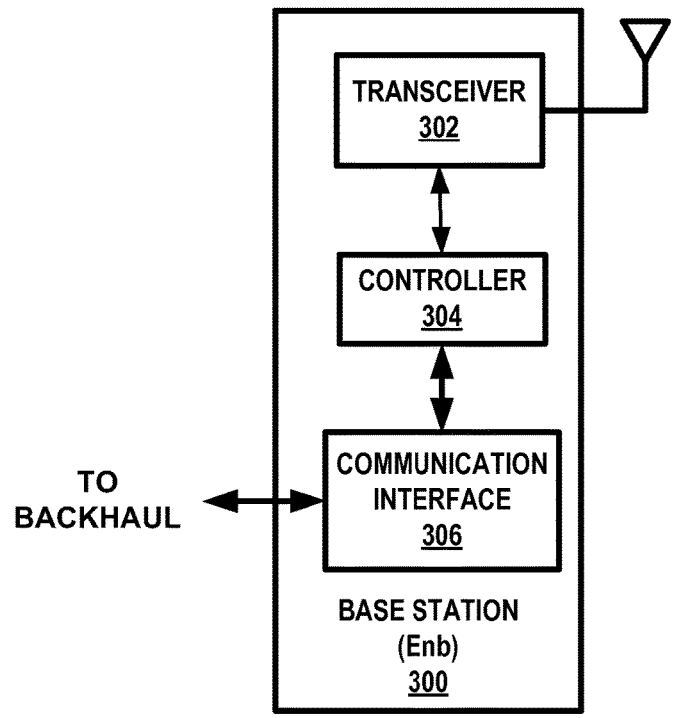
FIG. 3 is a block diagram of an example of a base station (eNB) suitable for use as the base station (eNB) in FIG. 1A and FIG. 1B.

FIG. 3 is a block diagram of an example of a base station (eNB) 300 suitable for use as the base station (eNB) 108 in FIG. 1A and FIG. 1B. The base station (eNB) 300 includes a transceiver 302, a controller 304, and a communication interface 306 as well as other components and circuitry (not shown) such as memory, for example.

The transceiver 302 exchanges wireless signals with the UE devices 104, 106 within the service area 106. Transmissions from the base station (eNB) and from the UE devices are governed by a communication specification that defines signaling, protocols, and parameters of the transmission. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels.

The transceiver 302, therefore, includes at least a downlink transmitter for transmitting downlink signals and an uplink receiver for receiving uplink signals. The receiver and controller measure one or more parameters to determine characteristics of the uplink channels. The receiver, therefore, is capable of measuring the reference signal transmitted by the UE devices to determines cellular channel characteristic information such as the quality of the cellular channel, required transmission power for transmission through the channel, and/or power levels related to the received reference signal such as total received power, signal to-noise-ratio (SNR), signal-to-interference-plus-noise ratio (SINR) (also known as the signal-to-noise-plus-interference ratio (SNIR)) or combinations thereof.

For the example, the base station (eNB) 300 also includes a communication interface 306 for facilitating communication over the backhaul with other eNBs and network entities. Where X2 signaling is available, the communication interface 312 communicates over the backhaul using X2.

In addition to other functions, the controller evaluates the channel characteristic information to select a communication link between the first UE device and the second UE device. For the examples herein, the controller selects the communication link based on the power levels of the reference signal received at the eNB and the UE devices.

Figure 4:
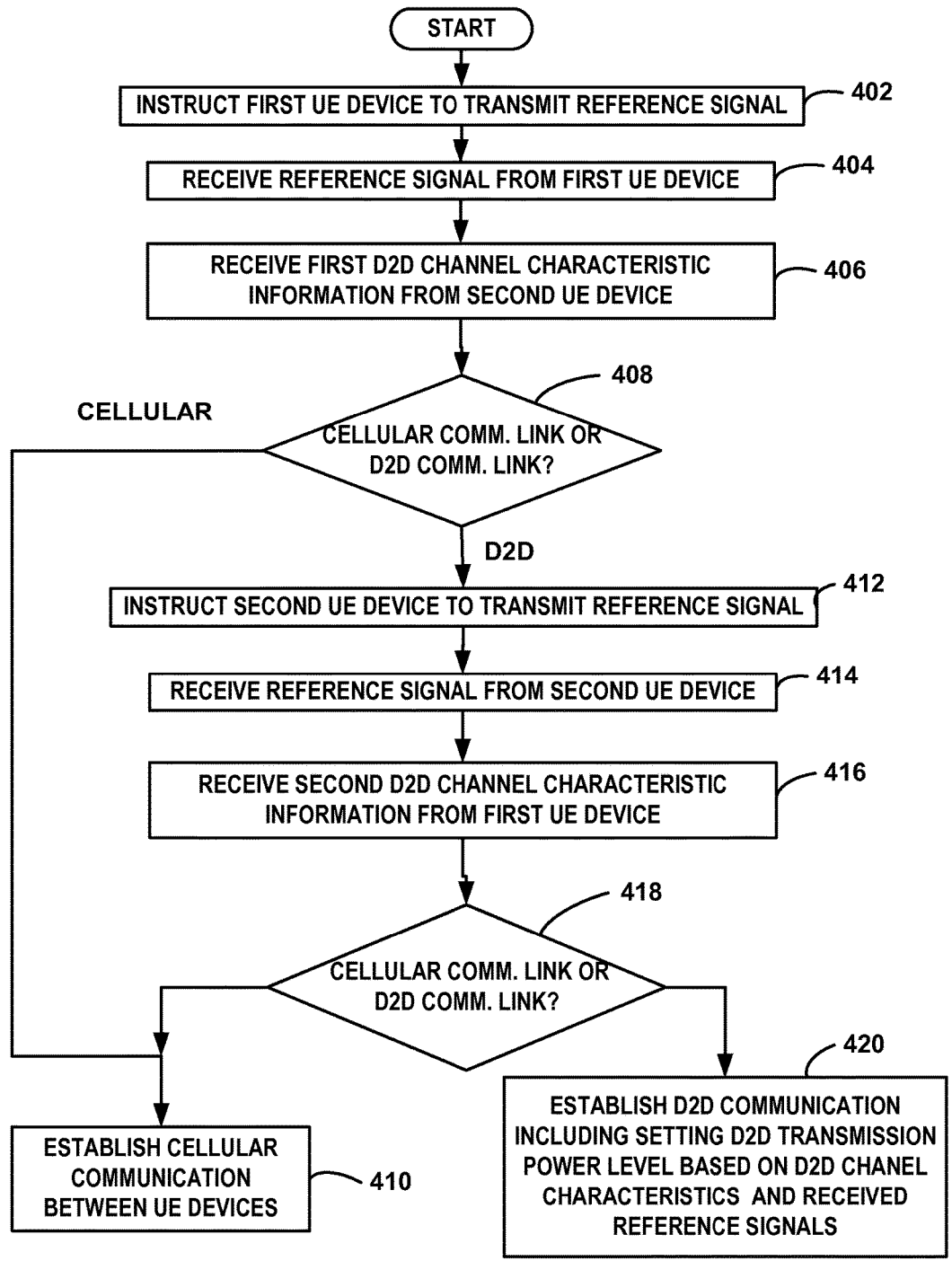
FIG. 4 is a flowchart of an example of a method of selecting a transmission link performed at an eNB.

FIG. 4 is a flowchart of an example of a method of selecting a transmission link performed at an eNB 108. For the examples herein, the method is performed by executing code on the controller and utilizing other components of the eNB 108. The steps of the method may be performed in a different order and some steps may be performed simultaneously in some situations. For example, reference signal transmission instructions can be sent to both UE devices at the same time.

At step 402, the eNB transmits a reference signal transmission instruction 144 to the first UE device 102 instructing the first UE device to transmit a reference signal. For the example, the instruction is transmitted over the PDCCH/PDSCH channel although other channels may be used.

At step 404, the eNB receives the first reference signal transmitted from the first UE device 102. The eNB 108 determines the cellular channel characteristics of the first portion 116 of the cellular communication link 112 by receiving and evaluating the first reference signal. As discussed above, the eNB may determine the cellular channel characteristics other than by evaluating the reference signal 140.

At step 406, the eNB receives the first D2D channel characteristic information from the second UE device 104. The second UE device 104 receives the first reference signal and determines the channel characteristic information based on the received signal. As discussed above, the channel characteristic information in the examples herein is indicative of the power of the received reference signal.

At step 408, the eNB determines if the D2D communication link 110 or the cellular communication link 112 is preferred for communication between the first UE device 102 and the second UE device 104. The eNB 108 compares the cellular channel characteristics of the first portion 116 of the cellular communication link 112 to the D2D channel characteristics indicated in the D2D channel characteristic information provided by the second UE device to determine the preferred link. In some situations, the selection of the link may be based on other factors in addition to channel quality. For the examples herein, the eNB 108 compares the received power level of the reference signal as received at the eNB to the received power level of the reference signal as received at the second UE device (and reported by the second UE device in the D2D channel characteristic information) to determine the preferred link. The cellular communication link is selected if the power level of the first reference signal received at the second UE device is less than the power level of the first reference signal received at the eNB 108. The D2D communication link is selected otherwise. If the cellular communication link is selected, the method continues at step 410 where the cellular communication link 112 is established between the first UE device and the second UE device. Otherwise, the method continues at step 412.

At step 412, the eNB transmits a reference signal transmission instruction 144 to the second UE device 104 instructing the second UE device to transmit a second reference signal. For the example, the instruction is transmitted over the PDCCH/PDSCH channel although other channels may be used.

At step 414, the eNB receives the second reference signal transmitted from the second UE device 104. The eNB 108 determines the cellular channel characteristics of the second portion 118 of the cellular communication link 112 by receiving and evaluating the second reference signal. As discussed above, the eNB may determine the cellular channel characteristics other than by evaluating the reference signal 140.

At step 416, the eNB receives second D2D channel characteristic information from the first UE device 102. The first UE device 102 receives the second reference signal and determines the D2D channel characteristic information based on the received signal. As discussed above, the channel characteristic information in the examples herein is indicative of the power of the received reference signal.

At step 418, the eNB determines if the D2D communication link 110 or the cellular communication link 112 is preferred for communication between the first UE device 102 and the second UE device 104. The eNB 108 compares the cellular channel characteristics of the second portion 118 of the cellular communication link 112 to the D2D channel characteristics indicated in the D2D channel characteristic information provided by the first UE device to determine the preferred link. In some situations, the selection of the link may be based on other factors in addition to channel quality. For the examples herein, the eNB 108 compares the received power level of the second reference signal as received at the eNB to the received power level of the second reference signal as received at the first UE device (and reported by the first UE device in the second D2D channel characteristic information) to determine the preferred link. The cellular communication link is selected if the power level of the second reference signal received at the first UE device is less than the power level of the second reference signal received at the eNB 108. The D2D communication link is selected otherwise. If the cellular communication link is selected, the method continues at step 410 where the cellular communication link 112 is established between the first UE device and the second UE device. Otherwise, the method continues at step 420.

At step 420, the D2D communication link is established between the first UE device 102 and the second UE device 104. Communication resources for D2D communication are assigned to the UE devices. In addition to information provided to the UE devices using conventional techniques, the eNB sets the power level of the D2D transmissions based on the D2D channel characteristic information and the cellular channel characteristics. The UE transmits D2D control and communication data in the assigned resources.

Figure 5:
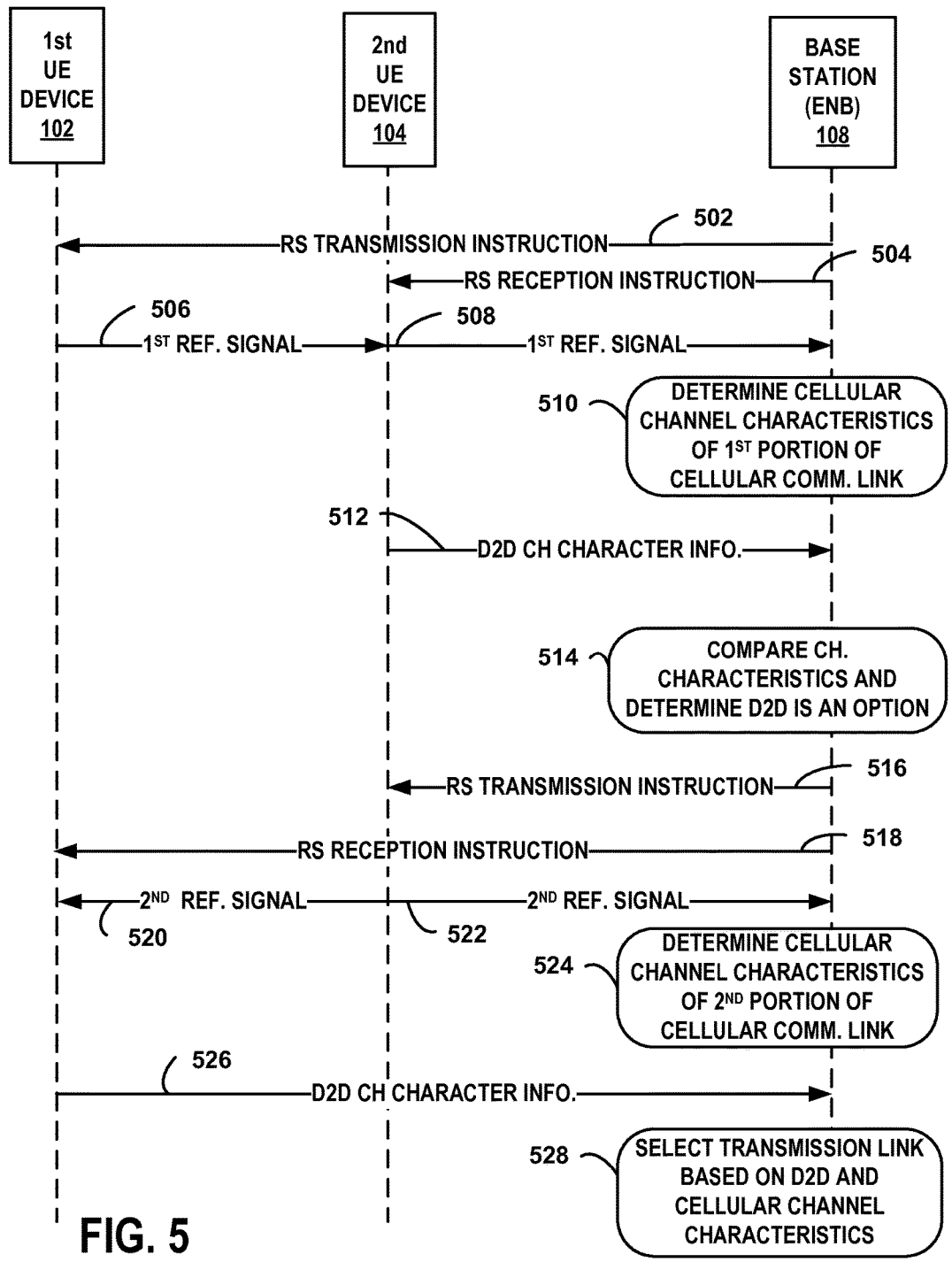
FIG. 5 is a message diagram for an example of selecting a transmission link for communication between the first UE device and the second UE device.

FIG. 5 is a message diagram 500 for an example of selecting a communication link for communication between the first UE device and the second UE device where the eNB determines that attenuation over the D2D communication link is less than the attenuation over the first portion of the cellular communication link. Therefore, the example of FIG. 5 includes evaluating the first and second portions of the cellular communications link and both directions of the D2D communication link.

At transmission 502, the eNB 108 transmits a reference signal transmission instruction 144 to the first UE device where the instruction identifies the communication resources that should be used by the first UE device transmit a first reference signal. For the example, the instruction is transmitted in the PDCCH/PDSCH although other channels can be used.

At transmission 504, the eNB 108 transmits a reference signal reception instruction 146 to the second UE device where the instruction 146 identifies the communication resources that will be used by the first UE device to transmit the first reference signal. For the example, the instruction 146 is transmitted in the PDCCH/PDSCH although other channels can be used. In some situations, the reference signal reception instruction 146 identifies communication resources that should be used by the second UE device to report the D2D channel characteristics to the eNB.

The first reference signal is transmitted by the first UE device 102 and received by the second UE device at event 506 and received at the eNB at event 508.

At event 510, the eNB 108 determines the cellular channel characteristics of the first portion 116 of the cellular communication link 112. For the example, the eNB measures the power level of the first reference signal as received at the eNB.

At transmission 512, the second UE device sends the D2D channel characteristic information to the eNB 108. For the example, the second UE device 102 measures the received power level of the first reference signal and sends a message indicative of the measured received power level to the eNB.

At event 514, the eNB compare the channel characteristic information and determines that the D2D communication link is still an option for communication. For the example, the eNB determines that the received power level of the first reference signal received at the eNB is less than the received power level of the first reference signal received at the second UE device. In examples where the received power level of the first reference signal received at the eNB is greater than the received power level of the first reference signal received at the second UE device, the events 516 through 526 may be omitted and the cellular communication link may be selected.

At transmission 516, the eNB 108 transmits a reference signal transmission instruction 144 to the second UE device where the instruction identifies the communication resources that should be used by the second UE device to transmit a second reference signal. For the example, the instruction is transmitted in the PDCCH/PDSCH although other channels can be used.

At transmission 518, the eNB 108 transmits a reference signal reception instruction 146 to the first UE device where the instruction 146 identifies the communication resources that will be used by the second UE device to transmit the second reference signal. For the example, the instruction 146 is transmitted in the PDCCH/PDSCH although other channels can be used. In some situations, the reference signal reception instruction 146 identifies communication resources that should be used by the first UE device to report the D2D channel characteristics to the eNB.

The first reference signal is transmitted by the second UE device 104 and received by the first UE device at event 520 and received at the eNB at event 522.

At event 524, the eNB 108 determines the cellular channel characteristics of the second portion 118 of the cellular communication link 112. For the example, the eNB measures the power level of the second reference signal as received at the eNB.

At transmission 526, the first UE device 102 sends the D2D channel characteristic information to the eNB 108. For the example, the first UE device 102 measures the received power level of the second reference signal and sends a message indicative of the measured received power level to the eNB.

At event 528, eNB selects the communication link. The eNB compares the channel characteristic information and determines whether the cellular communication link or the D2D communication link should be used for communication between the first UE device and the second UE device. For the example, the eNB determines whether the received power level of the second reference signal received at the eNB is less than the received power level of the second reference signal received at the second UE device. Where the received power level of the second reference signal received at the eNB is less than the received power level of the second reference signal received at the second UE device, the cellular communication link is selected. Otherwise, the D2D communication link is selected.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   instructing a first user equipment (UE) device to transmit a reference signal;
   receiving, from a second UE device, device-to-device (D2D) channel characteristic information indicative of a D2D communication link between the first UE device and the second UE device, the D2D channel characteristic information determined from UE device received reference signal that is the reference signal transmitted by the first UE device as received at the second UE device;
   determining cellular channel characteristic information indicative of at least a portion of a cellular communication link through a base station and between the first UE device and the second UE device; and
   selecting, at the base station, a transmission link from the cellular communication link and the D2D communication link for transmitting data between the first UE device and the second UE device, the selecting based at least in part on the cellular channel characteristic information and the D2D channel characteristic information.

2. The method of claim 1, wherein the determining cellular channel characteristic information comprises receiving a base station received reference signal transmitted from the first UE device.

3. The method of claim 2, wherein the base station received reference signal is the reference signal transmitted by the first UE device as received at the base station.

4. The method of claim 2, wherein the base station received reference signal is another reference signal different from the reference signal transmitted by the first UE device.

5. The method of claim 1, further comprising:
instructing the second user equipment (UE) device to transmit another reference signal;
receiving, from the first UE device, other device-to-device (D2D) channel characteristic information indicative of the D2D communication link between the first UE device and the second UE device, the other D2D channel characteristic information determined from another UE device received reference signal that is the another reference signal transmitted by the second UE device as received at the first UE device,
wherein the selecting comprises selecting, at the base station, the transmission link based at least in part on the cellular channel characteristic information, the D2D channel characteristic information and the other D2D channel characteristic information.

6. The method of claim 5, further comprising:
establishing the D2D communication link between the first UE device and the second UE device if the D2D communication link is selected as the transmission link.

7. The method of claim 6, wherein establishing the D2D communication link comprises setting a transmission power level of the D2D transmissions based on a received power level of the UE device received reference signal.

8. The method of claim 7, wherein establishing the D2D communication link comprises setting the transmission power level of the D2D transmissions based further on a received power level of the base station received reference signal.

9. The method of claim 1, wherein the instructing the first UE device to transmit the reference signal comprises providing, to the first UE device, frequency/time information identifying communication resources for transmitting the reference signal.

10. The method of claim 9, wherein the instructing the first UE device to transmit the reference signal comprises providing, to the first UE device, a power level for transmitting the reference signal.

11. A base station comprising:
a transmitter that is configured to transmit a reference signal transmission instruction instructing a first user equipment (UE) device to transmit a reference signal;
a receiver that is configured to receive, from a second UE device, device-to-device (D2D) channel characteristic information indicative of a D2D communication link between the first UE device and the second UE device, the D2D channel characteristic information determined from UE device received reference signal that is the reference signal transmitted by the first UE device as received at the second UE device; and
a controller that is configured to:
determine cellular channel characteristic information indicative of at least a portion of a cellular communication link through the base station and between the first UE device and the second UE device; and
select a transmission link from the cellular communication link and the D2D communication link for transmitting data between the first UE device and the second UE device, the selecting based at least in part on the cellular channel characteristic information and the D2D channel characteristic information.

12. The base station of claim 11, wherein:
the receiver is configured to receive a base station received reference signal; and
the controller is configured to determine the cellular channel characteristic from the base station received reference signal.

13. The base station of claim 12, wherein the base station received reference signal is the reference signal transmitted by the first UE device as received at the base station.

14. The base station of claim 12, wherein the base station received reference signal is another reference signal different from the reference signal transmitted by the first UE device.

15. The base station of claim 10, wherein:
the transmitter is configured to transmit another reference signal transmission instruction instructing the second user equipment (UE) device to transmit another reference signal;
the receiver is configured to receive, from the first UE device, other device-to-device (D2D) channel characteristic information indicative of the D2D communication link between the first UE device and the second UE device, the other D2D channel characteristic information determined from another UE device received reference signal that is the another reference signal transmitted by the second UE device as received at the first UE device; and
the controller is configured to select the transmission link based at least in part on the cellular channel characteristic information, the D2D channel characteristic information and the other D2D channel characteristic information.

16. A communication system comprising:
a first user equipment (UE) device;
a second UE device;
a base station comprising:
a transmitter that is configured to transmit a reference signal transmission instruction instructing the first user equipment (UE) device to transmit a reference signal, wherein the first UE device is configured to transmit the reference signal;
a receiver that is configured to receive, from the second UE device, device-to-device (D2D) channel characteristic information indicative of a D2D communication link between the first UE device and the second UE device, wherein the second UE device is configured to receive the reference signal as a UE device received reference signal and to determine the D2D channel characteristic information from the UE device received reference signal; and
a controller that is configured to:
determine cellular channel characteristic information indicative of at least a portion of a cellular communication link through the base station and between the first UE device and the second UE device; and
select a transmission link from the cellular communication link and the D2D communication link for transmitting data between the first UE device and the second UE device, the selecting based at least in part on the cellular channel characteristic information and the D2D channel characteristic information.

17. The communication system of claim 16, wherein:
the receiver is configured to receive a base station received reference signal; and
the controller is configured to determine the cellular channel characteristic from the base station received reference signal.

18. The communication system of claim 16, wherein the base station received reference signal is the reference signal transmitted by the first UE device as received at the base station.

19. The communication system of claim 16, wherein:
the transmitter is configured to transmit another reference signal transmission instruction instructing the second user equipment (UE) device to transmit another reference signal, the second UE device configured to transmit another reference signal, the first UE device configured to determine other D2D channel characteristic information indicative of the D2D communication link based on another UE device received reference signal that is the another reference signal transmitted by the second UE device as received at the first UE device;
the receiver is configured to receive, from the first UE device, the other D2D channel characteristic information; and
the controller is configured to select the transmission link based at least in part on the cellular channel characteristic information, the D2D channel characteristic information and the other D2D channel characteristic information.

* * * * *